H. W. DOPP.
Vapor Burner.
No. 30,621.
Patented Nov. 13, 1860.
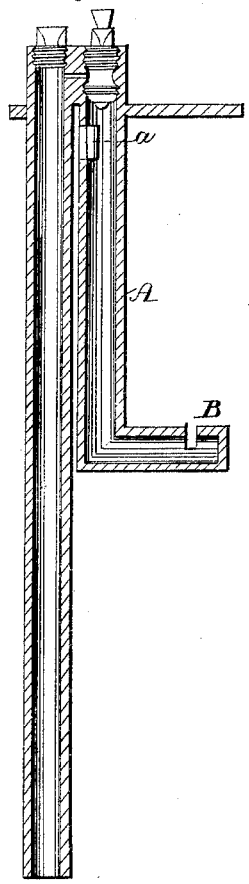
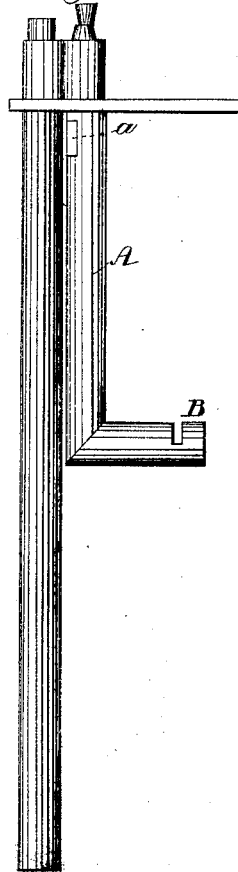
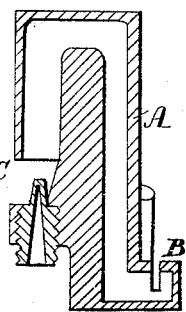
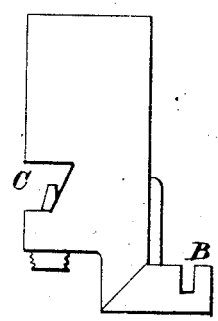

UNITED STATES PATENT OFFICE.

H. WILLIAM DOPP, OF BUFFALO, NEW YORK.

VAPOR-LAMP.

Specification of Letters Patent No. 30,621, dated November 13, 1860.

*To all whom it may concern:*

Be it known that I, H. W. DOPP, of Buffalo, in the county of Erie and State of New York, have invented certain new and useful Improvements in Vapor-Burning Lamps; and I do hereby declare that the following is a full, clear, and exact description of the same, reference being had to the accompanying drawings and to the letters of reference marked thereon.

Figures 1 and 3, of the annexed drawings represent a plan for accomplishing my object varying slightly from that seen in Figs. 2, and 4.

These improvements are applicable to that class of lamps which burn the coal oil gas or vapor and the feature which I consider new is mingling the vapor with atmospheric air near the generating point and causing the two to descend to the burner. The air and the gas have been mingled below the burner, in which case they were compelled to ascend before they were burned—not being compelled to descend at any time. In Figs. 1 and 3, the air and gas are mingled at $a$, and are caused to descend through pipe A to burner B. In Figs. 2, and 4, the gas and air are mingled at $c$. They then ascend slightly but then descend to the burner at B. The advantage derived is that the gas and the air being heated as they pass down pipe A, unite more perfectly, and consequently produce more perfect combustion.

The idea of causing the vapor in air-vapor lamps to ascend to the generator and burner in order to produce a gas light is not new and this I do not claim, but

What I claim as new and valuable and desire to secure by Letters Patent, is—

Mingling the vapor formed, with atmospheric air, above the burner, as at $a$, $a$, Figs. 1, and 3, the vapor and the air descending through the pipe A, to be burned at the burner B, as and for the purposes herein specified.

H. WILLIAM DOPP.

Witnesses:
   I. FORSYTH,
   J. B. WHITE.